(12) United States Patent  (10) Patent No.: US 7,714,536 B1
Silberg et al.  (45) Date of Patent: May 11, 2010

(54) BATTERY CHARGING ARRANGEMENT FOR UNMANNED AERIAL VEHICLE UTILIZING THE ELECTROMAGNETIC FIELD ASSOCIATED WITH UTILITY POWER LINES TO GENERATE POWER TO INDUCTIVELY CHARGE ENERGY SUPPLIES

(75) Inventors: Eric J. Silberg, North Bethesda, MD (US); Judah H. Milgram, Hyattsville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 491 days.

(21) Appl. No.: 11/789,128

(22) Filed: Apr. 5, 2007

(51) Int. Cl.
*H02J 7/00* (2006.01)
(52) U.S. Cl. ............................ 320/108; 244/58; 191/10; 320/109
(58) Field of Classification Search .................. 320/108; 244/58; 191/10
See application file for complete search history.

(56) References Cited

U.S. PATENT DOCUMENTS

| 5,311,973 | A | 5/1994 | Tseng et al. |
| 5,548,279 | A | 8/1996 | Gaines |
| 5,821,728 | A | 10/1998 | Schwind |
| 6,879,889 | B2 | 4/2005 | Ross |
| 7,318,564 | B1 * | 1/2008 | Marshall ...................... 244/58 |
| 7,398,946 | B1 * | 7/2008 | Marshall ...................... 244/58 |

* cited by examiner

*Primary Examiner*—Edward Tso
*Assistant Examiner*—Manuel Hernandez
(74) *Attorney, Agent, or Firm*—Dave A. Ghatt

(57) ABSTRACT

A method and apparatus for charging energy supplies in an unmanned aerial vehicle (UAV). The present invention relates to a UAV that comprises an inductive charging device that utilizes the electromagnetic field emanated by overhead/utility power lines, to charge the energy supplies. The UAV also includes a releasable latch for holding power lines to allow for the perching of the UAV on power lines during the charging process. The latch and the inductive charging device may be provided on a single device, a battery augmentation trap (BAT). The UAV may be perched in an upright orientation to allow for takeoff after the charging of energy supplies on the power line.

15 Claims, 4 Drawing Sheets

BATTERY CHARGING ARRANGEMENT FOR UNMANNED AERIAL VEHICLE UTILIZING THE ELECTROMAGNETIC FIELD ASSOCIATED WITH UTILITY POWER LINES TO GENERATE POWER TO INDUCTIVELY CHARGE ENERGY SUPPLIES

STATEMENT OF GOVERNMENT INTEREST

The invention described herein may be manufactured and used by or for the Government of the United States of America for governmental purposes without the payment of any royalties thereon or therefore.

FIELD OF THE INVENTION

The present invention relates generally to a method and apparatus for charging energy supplies in an unmanned aerial vehicle (UAV), more particularly, the present invention relates to a UAV that comprises an inductive charging device that generates a charging current by utilizing the electromagnetic field emanated by overhead/utility power lines, the UAV also including a latch for perching on the utility power lines during the charging process.

BACKGROUND OF THE INVENTION

An unmanned aerial vehicle, commonly referred to a UAV, is an aircraft with no onboard pilot. UAVs may be expendable or recoverable and may fly autonomously or remotely. In autonomous applications, the vehicle is either pre-programmed with flight plans or may have the ability to determine its own flight plan based on a prescribed mission. UAVs are commonly employed by the Navy, Army, and Air Force for military purposes. UAVs are also employed in the private sector to perform services such as, crop dusting, forest fire monitoring, aerial photography, and meteorological, environmental, or other forms of surveillance.

Currently, electrically powered UAVs are limited in range and duration by the size and weight of the batteries which they can carry. Batteries can make up a significant percentage of the available payload weight. Consequently, there is an inherent tradeoff between duration and useful payload. Because of these constraints, the flight times of electrically powered UAVs are typically limited to less than one hour. Additionally, the distance traveled from a base location is also limited. Also of concern is that UAV batteries slowly lose their energy even when they are completely powered down. This limits the ability of UAVs to shut down for extended periods of time and then be useful again if the vehicle cannot be recharged. Because of these problems, it is desired to have a means to recharge UAV batteries that does not require a return to the base location. It is also desired to have a means to recharge the batteries that enables the UAV to perform job functions in a more efficient manner.

SUMMARY OF THE INVENTION

The present invention addresses aspects of problems outlined above. Preferred embodiments of the present invention provide a method and apparatus for charging energy supplies in an unmanned aerial vehicle.

In one aspect, the invention is a method of charging energy supplies in an airborne unmanned aerial vehicle. The method includes the providing of a battery augmentation trap, which is attached the unmanned aerial vehicle. In this aspect, the battery augmentation trap comprises a releasable latch, and an inductive charging device for charging the energy supplies. The method also includes the perching of the unmanned aerial vehicle on a utility power line. This is accomplished by maneuvering the airborne unmanned aerial vehicle so that the releasable latch of the unmanned aerial vehicle secures the utility power line within the releasable latch, after which the utility power line supports the unmanned vehicle. The method further includes the charging of the energy supplies with the inductive charging device. The inductive charging device utilizes the electromagnetic field associated with the utility power line to generate power for the energy supplies.

In another aspect, the invention is an unmanned aerial vehicle. The unmanned aerial vehicle has a vehicle body that includes a vertical reference line and a horizontal reference line. In this aspect, the vehicle body has a base portion, a propulsion system, and a battery augmentation trap. According to the invention, the battery augmentation trap comprises an inductive charging device for charging energy supplies, and a releasable latch for releasably holding a utility power line. The battery augmentation trap is attached to the vehicle body above the center of gravity of the vehicle body along a substantially vertical line through the center of gravity. According to the invention, when the releasable latch holds the utility power line, the unmanned aerial vehicle is supported by the latch such that horizontal reference line of the vehicle body and vertical reference line of the vehicle body are maintained in substantially horizontal and substantial vertical orientations respectively.

In another aspect, the invention is an unmanned aerial vehicle having a vehicle body. The unmanned aerial vehicle includes a vertical reference line and a horizontal reference line and a vehicle body. The vehicle body includes a propulsion system, an inductive charging device for charging energy supplies, and a releasable latch for releasably holding a utility power line. In this aspect, the releasable latch is attached to the vehicle body above the center of gravity of the vehicle body along a substantially vertical line through the center of gravity. In this aspect, when the releasable latch holds the utility power line, the unmanned aerial vehicle is supported by the latch such that horizontal reference line of the vehicle body and vertical reference line of the vehicle body are maintained in substantially horizontal and substantial vertical orientations respectively.

BRIEF DESCRIPTION OF DRAWINGS

A more complete appreciation of the invention and many of its attendant advantages will be readily appreciated as the same becomes better understood by reference to the following detailed description when considered in connection with the accompanying drawing wherein.

DETAILED DESCRIPTION

Figure 1A:
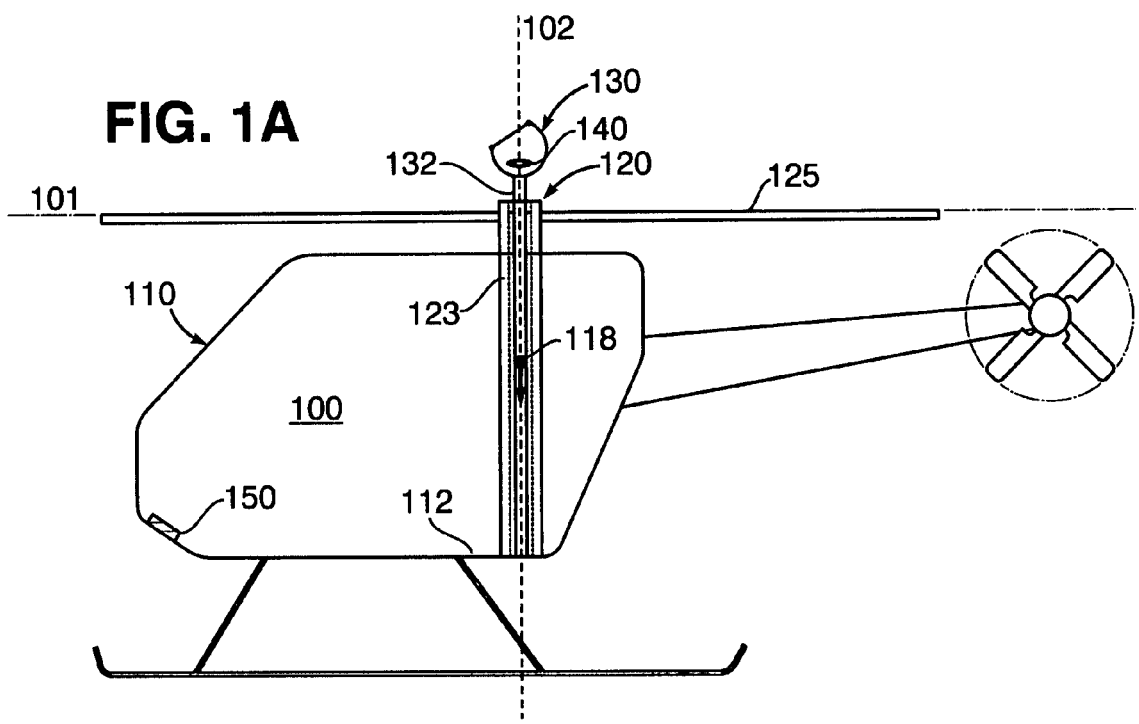
FIG. 1A is a perspective view of an unmanned aerial vehicle in accordance with an embodiment of the present invention.

FIG. 1A is a perspective view of an unmanned aerial vehicle (UAV) 100 in accordance with an embodiment of the present invention. The UAV 100 is a vertical takeoff vehicle, and as illustrated in FIG. 1A, the UAV is in an upright orientation. The UAV 100 has a horizontal reference line 101 and a vertical reference line 102. In the upright orientation, the horizontal reference line 101 has a substantially horizontal orientation, and the vertical reference line 102 has a substantially vertical orientation. When the UAV 100 is in motion, the horizontal and vertical reference lines may assume other orientations.

In this embodiment, the UAV 100 has a vehicle body 110 with a base portion 112. The UAV 100 is powered by a propulsion system, shown generally at 120. The propulsion system, which is preferably electrically powered, includes a hollow rotor shaft 123 and one or more horizontal rotors 125 attached to the hollow rotor shaft 123. As illustrated, the horizontal reference line 101 coincides with the horizontal plane through which the rotor 125 rotates. The vertical reference line 102 runs along and parallel to the hollow rotor shaft 123.

FIG. 1A also shows a battery augmentation trap (BAT) 130. In this embodiment, the BAT 130 is mounted through the hollow rotor shaft 123, via a BAT mount 132, the BAT mount secured to the base 112 of the vehicle body. As illustrated, the BAT 130 is mounted above the center of gravity 118 of the unmanned aerial vehicle 100. In the upright orientation, both the BAT 130 and the center of gravity 118 lie along the vertical reference line 102, which is substantially vertically oriented.

Figure 1B:
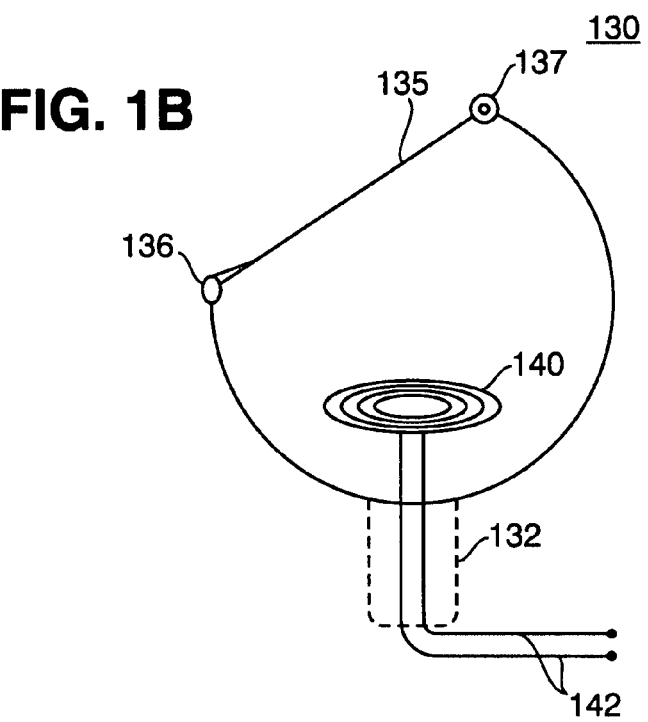
FIG. 1B is a schematic illustration of a battery augmentation device in accordance with an embodiment of the present invention.

FIG. 1B is a schematic illustration of the BAT 130 in accordance with an embodiment of the present invention. As shown, the BAT 130 includes a releasable latch 135 that pivots about a hinge 137. The BAT also includes a clip 136 that secures the latch 135 in the locked position. The latch 135 is movable between an open position and a locked position. Both the clip 136 and the hinge 137 may include electromechanical elements to enable movement between the closed and open positions. The latch may be selectively locked by controlling a flow of electricity to electromechanical elements 136 and 137. Additionally, the latch arrangement may comprise a rubber material to provide insulation from the current flowing through the power lines.

The BAT 130 further includes an inductive charging device 140 having leads 142 for charging the energy supplies of the UAV. The leads 142 extend from the BAT into the vehicle body 110, where the leads make electronic contact with energy supplies within the vehicle body. The energy supplies may include batteries that power the UAV and/or sensors within the UAV. Although the figures illustrate only two leads 142, two or more leads may be included to meet the requirements of the energy supplies.

As stated above, the inductive charging device 140 is implemented for charging energy supplies in the UAV. Typically, inductive charging systems transfer power by magnetically coupling a primary supply source to a secondary receiving source. According to the invention, overhead/utility power lines that carry alternating currents are utilized as a primary supply source, and the inductive charging device is the secondary receiving source. The electromagnetic flux associated with overhead/utility power lines induces an electric current in a nearby wire in the inductive charging device. This current is subsequently utilized to charge the energy supplies of the UAV. To increase the induced current, the inductive charging device 140 may include a wire with at least one turn, and the wire may be wound about a ferromagnetic core.

Because of the ability to generate an electric current from the electromagnetic flux associated with power lines, the inductive charging device 140 may also be utilized as a detector for detecting the presence of overhead power lines. Alternatively, a sensing means 150, independent of the charging device 140, may be used for detecting the presence of the overhead wires. The sensing means would also generate an electric current in response to the detection of an electromagnetic field. The sensing means, which may comprise a plurality of inductive arrangements and/or antennae, may be used to detect the direction of the power lines. The arrangement may also include a signal processor to determine the time to impact the power line, as it relates to the velocity of the UAV.

Figure 1C:
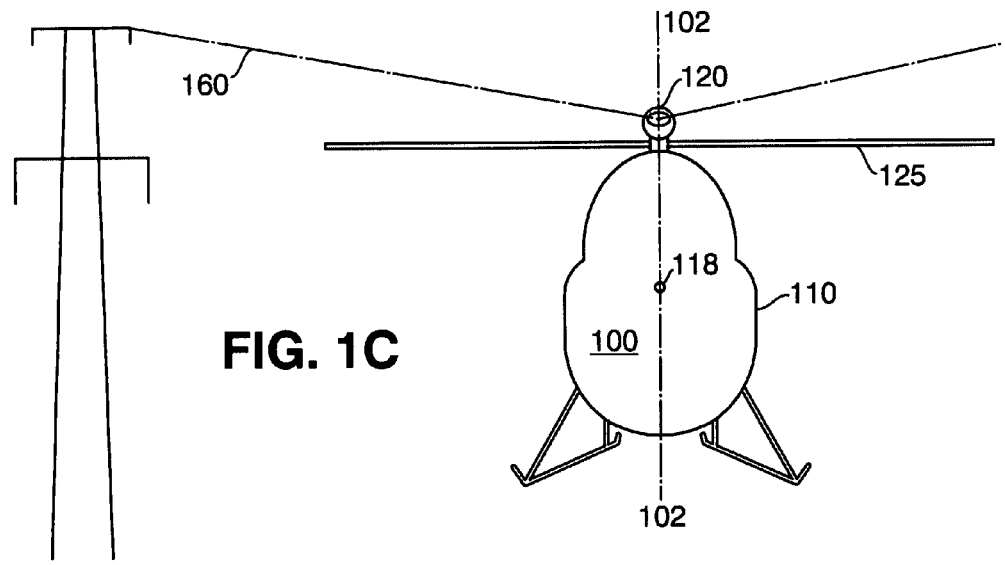
FIG. 1C is a perspective view of an unmanned aerial vehicle in a perched position in accordance with an embodiment of the present invention.

FIG. 1C is a perspective view of an unmanned aerial vehicle in a perched position in accordance with an embodiment of the present invention. FIG. 1C shows the UAV 100 perched in an upright orientation. The UAV 100 is supported on an overhead/utility power line 160 with the BAT 130 securing the power line, via the releasable latch 135. As illustrated, in the perched position, the vertical reference line 102 is maintained in a substantially vertical orientation. Therefore in the perched position, the BAT 130 is positioned above the center of gravity of the UAV 100 along a substantially vertical line through the center of gravity 118, wherein when the releasable latch holds the power line, the rotors 125 are maintained in a substantially horizontal plane. In the perched position the rotors 125 are stationary, however because of the positioning of the BAT 130 in relation to the center of gravity 118, the rotors can be rotated freely without contacting the power line. Although the UAV 100 shown in FIGS. 1A and 1C is a helicopter, other rotorcrafts may be used, such as a fixed pitch quad-rotor vehicle. Similar to the helicopter embodiment, the BAT in a fixed pitch quad-rotor vehicle for example, would be positioned above the center of gravity of the vehicle to allow for a balanced and safe perched position.

Figure 2A:
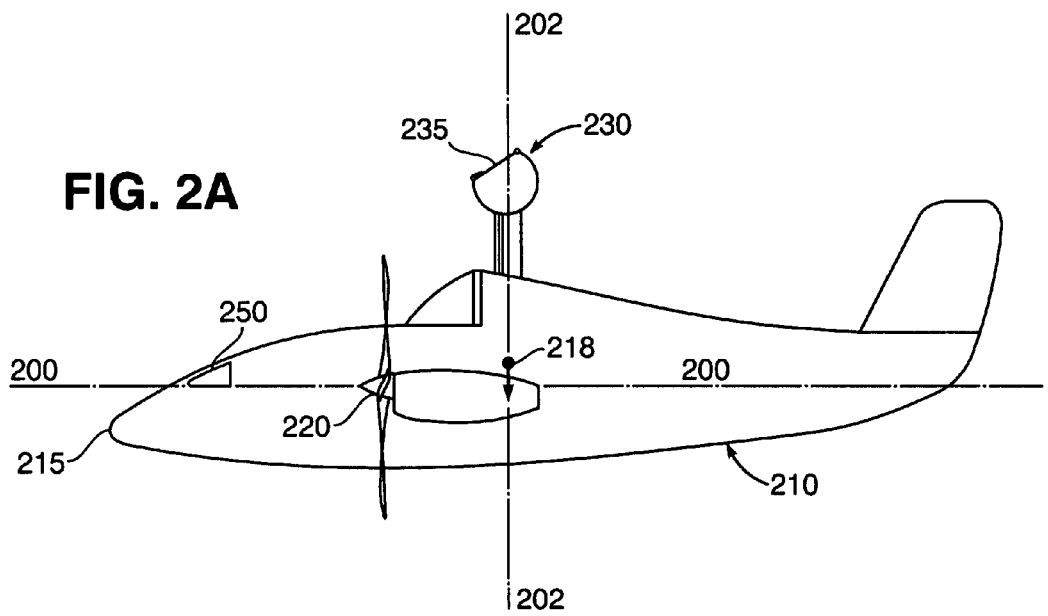
FIG. 2A is a perspective view of an unmanned aerial vehicle in accordance with an embodiment of the present invention.

FIG. 2A is a perspective view of an unmanned aerial vehicle (UAV) 200 in accordance with an embodiment of the present invention. As opposed to the UAV 100, the UAV 200 is not a vertical takeoff vehicle. In FIG. 2A, the UAV 200 is in an upright orientation, the UAV 200 having a horizontal reference line 201 and a vertical reference line 202. In the upright orientation, the horizontal reference line has a substantially horizontal orientation, and the vertical reference line 202 has a substantially vertical orientation. When the UAV 200 is in motion, the reference lines may assume other orientations.

In this embodiment, the UAV 200 has a vehicle body 210 with a nose 215, and is powered by a propulsion system, shown generally at 220. The propulsion system, which is preferably electrically powered, is a forward thrust unit that may comprise propeller or ducted fan-based units. FIG. 2A also shows a battery augmentation trap (BAT) 230. The BAT 230 may be mounted on an upper surface of the vehicle body 210, above a center of gravity 218 of the UAV 200, so that in the upright orientation, both the BAT 230 and the center of gravity 218 lie along the vertical reference line 202, which is substantially vertically oriented. The BAT 230 includes a latching arrangement and an inductive charging device similar to the embodiment outlined with respect to FIGS. 1A-1C.

Consequently, the description of the structure and operation of BAT 130 also applies to BAT 230. Similar to the embodiment of FIGS. 1A-1C, BAT 230 may be used as a sensor to detect the presence of overhead/utility power lines. Alternatively, UAV 200 may include one or more sensors 250 independent of the BAT to detect the presence, location, and direction of power lines.

Figure 2B:
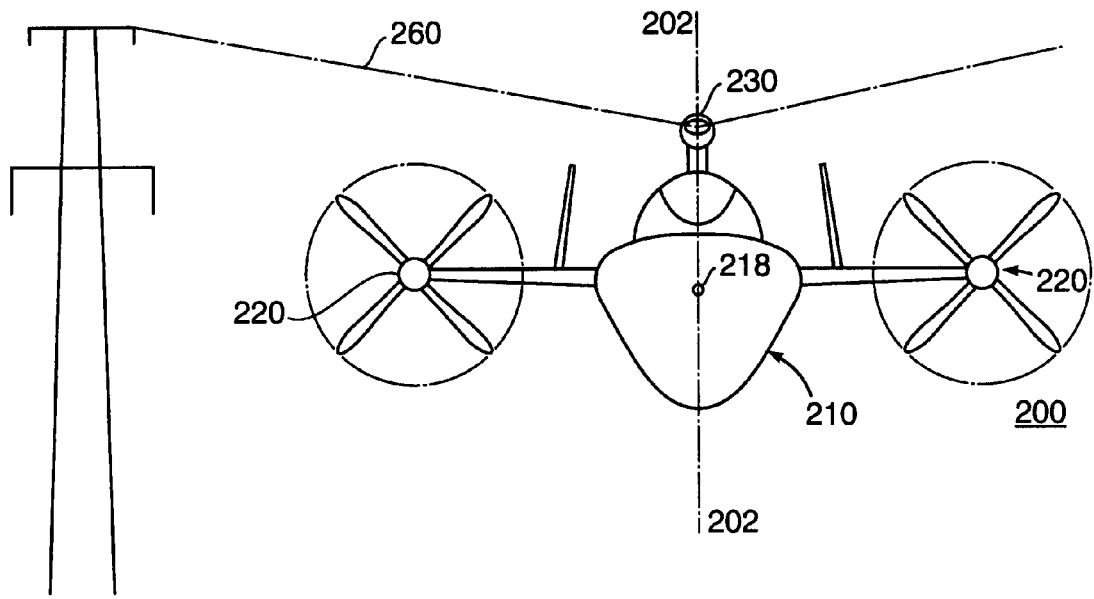
FIG. 2B is a perspective view of an unmanned aerial vehicle in a perched position in accordance with an embodiment of the present invention.

FIG. 2B is a perspective view of an unmanned aerial vehicle in a perched position in accordance with an embodiment of the present invention. FIG. 2B shows the UAV 200 perched in a substantially upright orientation, with the UAV supported on an overhead/utility power line 260 with the BAT 230 securing the power line, via the releasable latch 235. As illustrated, in the perched position, the vertical reference line 202 is maintained in a substantially vertical orientation. The BAT 230 is positioned above the center of gravity of the UAV 200 along a substantially vertical line through the center of gravity 218. In this embodiment, the substantially vertical line may be slightly tilted so that the nose 215 is marginally angled downwards to allow the UAV to glide downwards from the perched position, if the releasable latch 235 is opened. In this embodiment, the lift forces for gliding may be generated solely by the wings of the vehicle. Alternatively, the lift forces for gliding may be generated by a combination of the wings and the propulsion system. The BAT may also be positioned at other locations on the vehicle body 210, especially if the UAV 200 is permanently retained in the perched position. As will be discussed below, in some applications, it may be desirable to permanently affix the UAV 200 to the power line in order to charge energy supplies and to allow for persistent surveillance, i.e., the indefinite monitoring of environmental conditions. In these situations, it is not necessary to maintain the UAV in an upright perched orientation.

Figure 3:
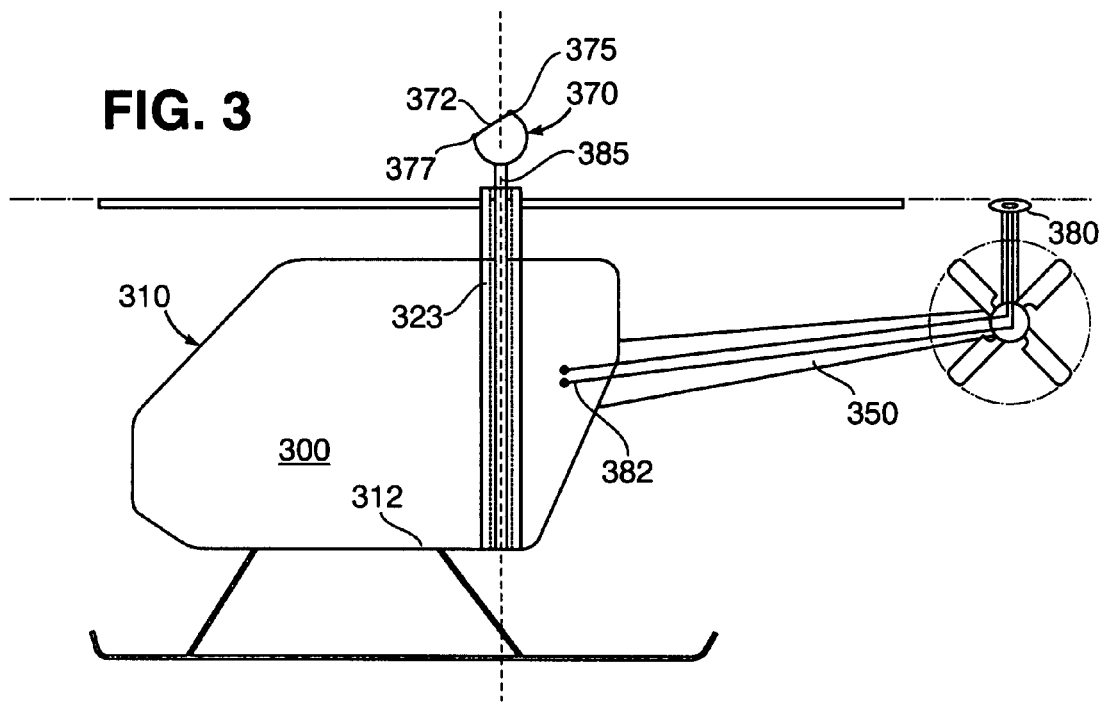
FIG. 3 is a perspective view of an unmanned aerial vehicle in accordance with an embodiment of the present invention.

FIG. 3 is a perspective view of an unmanned aerial vehicle in accordance with an embodiment of the present invention. FIG. 3 shows an unmanned aerial vehicle (UAV) 300 having a vehicle body 310, similar to that as illustrated in FIG. 1A. However, as opposed to a battery augmentation device that contains both a releasable latch and an inductive charging device, UAV 300 includes a releasable latching arrangement 370 and a separate inductive charging device 380. The latching arrangement 370 includes a latch 372 that pivots about a hinge 375, the latch secured by a clip 377. The latch 372 is movable between an open position and a closed locked position. Both the hinge 375 and the clip 377 may include electromechanical elements to enable movement between the closed and open positions. The latching arrangement 370 attached to a latch mount 385, which is disposed within a hollow rotor shaft 323. The latch mount 385 is fixed to a base portion 312 of the vehicle body 310. The inductive charging device 380 is mounted on a tail boom section 350 of the UAV, independent of the latching arrangement 370, to maximize utilization of the electromagnetic flux emanating from the power lines. The inductive charging device 380 includes two or more leads 382 that are used to charge energy supplies. Although FIG. 3 illustrates a helicopter, any of the previously outlined UAVs may include an arrangement in which the releasable latch and the inductive charging device are positioned at different locations on the UAV.

Figure 4:
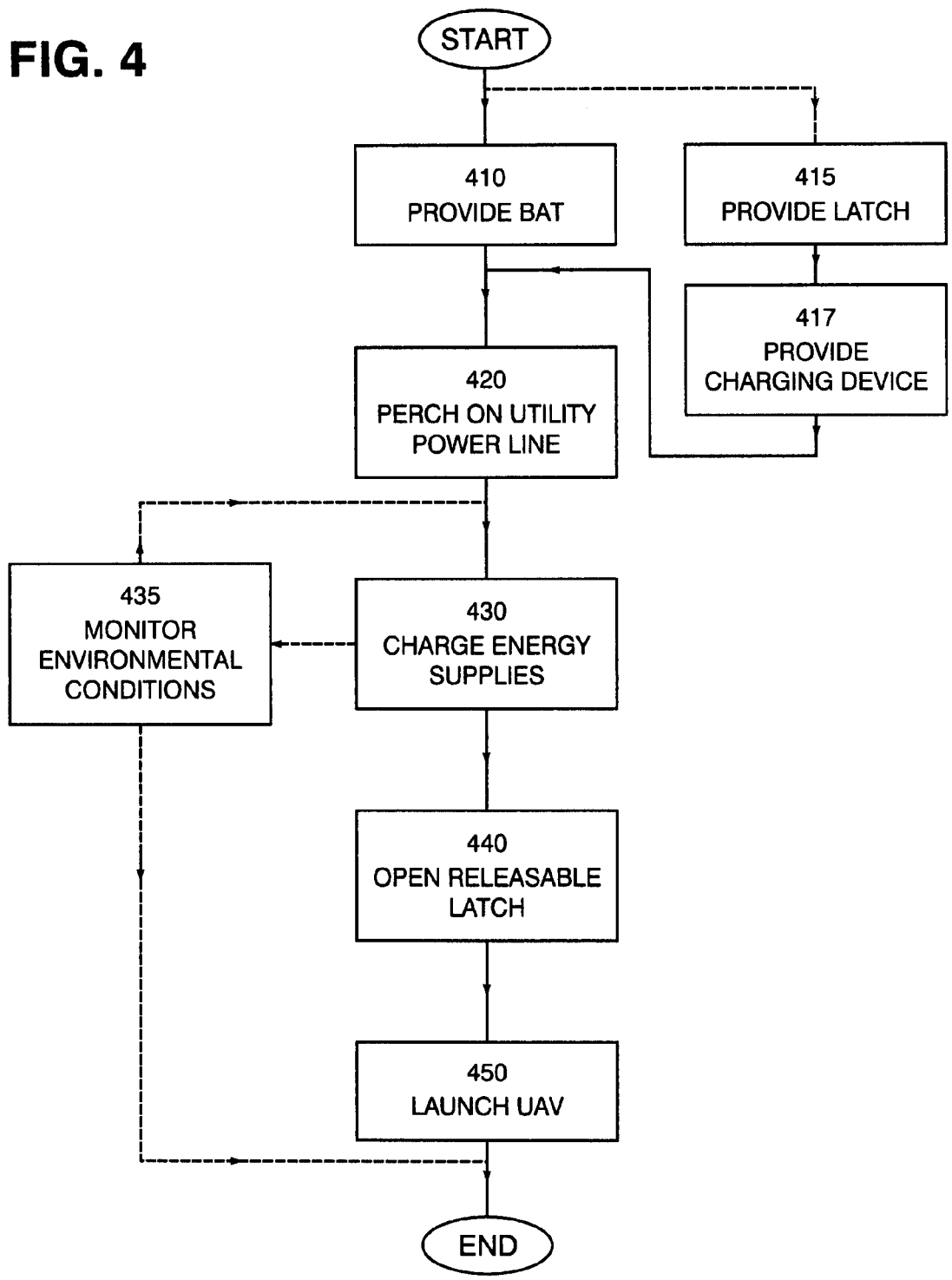
FIG. 4 is a flowchart outlining a method in accordance with an embodiment of the present invention.

FIG. 4 is a flowchart outlining a method 400 of charging energy supplies in an unmanned aerial vehicle (UAV). The method utilizes the electromagnetic flux associated with overhead/utility power lines that carry alternating currents, to generate a current for charging onboard energy supplies. The UAV is preferably a vertical takeoff vehicle, such as a helicopter. Alternatively, other rotorcrafts such as a fixed pitch quad-rotor vehicle or an autogiro maybe be employed. The UAV may also be a non-vertical takeoff vehicle, such as an airplane. Additionally, the UAV may be expendable or recoverable and may fly autonomously or remotely. Method 400 is typically related to UAVs that takeoff from a base location, and are in mid-flight at a location remote from the base location. The method is directed towards charging the UAV's energy supplies using overhead/utility power lines as an energy source, thereby negating the need for the UAV to return to the base location for charging purposes.

Step 410 is the providing of a battery augmentation trap (BAT). As illustrated in FIGS. 1A and 2A, the BAT is attached to the vehicle body. In an embodiment in which the UAV is a helicopter as shown in FIGS. 1A and 1C, the BAT is located above the rotors, above the center of gravity of the UAV, along a substantially vertical line through the center of gravity. In an embodiment in which the UAV is an airplane as shown in FIGS. 2A and 2B, the BAT may be located above the vehicle body, above the center of gravity of the UAV, along a substantially vertical line through the center of gravity. As shown in FIG. 1B, the BAT includes a releasable latch for releasably holding an overhead/utility power line. The BAT also includes an inductive charging device that utilizes the electromagnetic flux associated with the power line to generate a current for charging energy supplies on the UAV.

As an alternative to step 410, steps 415 and 417 may be implemented in the method of charging energy supplies in a UAV. At step 415 a releasable latch is provided on an upper surface of the UAV, as shown in FIG. 3. At step 417, an inductive charging device is provided on the UAV at a location independent of the latch. In an embodiment in which the UAV is a helicopter, the inductive charging device may be provided on tail boom portion to maximize the utilization of the electromagnetic flux associated with overhead/utility power lines.

Step 420 is the perching of the UAV on an overhead/utility power line. This step includes the detecting of the power line, which may be accomplished by onboard sensors, or from a remote location such as the base location. Upon the detection of the power line, the UAV maneuvers towards the power line so that the releasable latch of the BAT secures the power line. The securing of the power line may involve the opening and/or closing of the releasable latch. As illustrated in FIGS. 1C and 2B, the UAV may be perched in an upright orientation. Alternatively, the UAV may be perched in another orientation, particularly in situations involving persistent surveillance, where the UAV is indefinitely perched on the power line. If the UAV is a rotorcraft such as a helicopter, the step of securing the power line would involve the hovering of the UAV in close proximity to the power line in order to reduce stresses on the power line. If the UAV is a non-vertical takeoff vehicle such as an airplane, the step of securing is accomplished by flying the UAV at a reduced speed into the power line so that the releasable latch contacts and secures the power line. As outlined above, onboard sensors may be used to detect the presence and location of overhead power lines.

Step 430 is the charging of the energy supplies with the inductive charging device. The energy supplies include all of the UAV's onboard energy supplies such as batteries associated with the propulsion system and sensors. As outlined above, the electromagnetic flux associated with overhead/utility power lines induces an electric current in a nearby wire in the inductive charging device. This current is subsequently utilized to charge the energy supplies, such as batteries of the UAV. Step 430 may be followed by step 435 where one or more sensors on the UAV are used to monitor environmental conditions indefinitely, by for example, performing surveillance imagery. The environmental conditions may include weather conditions, temperature conditions, traffic patterns, human activity etc. At 435, the UAV may be indefinitely perched on the power line, which the UAV monitors environmental conditions. Step 435 is preferably applicable in embodiments where the UAV is a non-vertical lift vehicle such as an airplane because subsequent takeoff may be difficult. However, step 435 may also be performed in embodiments where the UAV is a vertical takeoff vehicle, such as a helicopter. In this embodiment the charging of the energy supplies with the inductive charging device is provided either continuously or repeatedly to provide energy for the one or more sensors.

Step 440, the opening of the releasable latch to release the UAV from the perched position, may optionally follow 430. Step 450 is the launching of the UAV into an airborne state. Step 450 maybe commence after step 440. Alternatively, steps 440 and 450 may commence simultaneously. Launching is possible in embodiments in which the UAV is maintained in an upright orientation when in the perched position. For instance, in the helicopter embodiment as illustrated in FIG. 1C, the rotor blades may be rotated prior to the opening of the releasable latch. As outlined above, the perched upright orientation allows for the rotation of rotors free of contact with the overhead power line. Consequently, when the releasable latch opens, the helicopter has already generated lift forces to allow for hovering or upward takeoff. Alternatively, in the airplane embodiment as illustrated in FIG. 2B, in the perched upright orientation, the nose 215 of the plane is marginally angled downwards to allow the UAV to glide downwards from the perched position, when the releasable latch 235 is opened. As outlined above, in this method the lift forces may be generated solely by the wings of the vehicle. Alternatively, the lift forces may be generated by a combination of the wings and the propulsion system when the vehicle is angled in such a manner that allows this. In an airplane embodiment, the initial launching is a downward glide towards a ground surface, with optional upward movement depending on the implementation of the propulsion system. The UAV may glide downwards until the UAV lands on a surface or has achieved a high enough velocity that upward motion is possible. If the UAV lands, the UAV with the charged energy sources may subsequently takeoff to an airborne state.

What has been described and illustrated herein are preferred embodiments of the invention along with some variations. The terms, descriptions and figures used herein are set forth by way of illustration only and are not meant as limitations. For example, as opposed to the helicopter illustrated in FIGS. 1A, 1C, and FIG. 3, a fixed pitch quad-rotor vehicle may be employed as a vertical takeoff vehicle. Additionally, alternative configurations for the releasable latch may be employed. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A method of charging energy supplies in an airborne unmanned aerial vehicle, the method comprising:
   providing a battery augmentation trap attached to the unmanned aerial vehicle, the battery augmentation trap comprising;
      a releasable latch, and
      an inductive charging device for charging the energy supplies,
   perching the unmanned aerial vehicle on a utility power line by maneuvering the airborne unmanned aerial vehicle so that the releasable latch of the unmanned aerial vehicle secures the utility power line within the releasable latch after which the utility power line supports the unmanned vehicle; and
   charging the energy supplies with the inductive charging device utilizing the electromagnetic field associated with the utility power line to generate power for the energy supplies,
   providing a propulsion system having a hollow rotor shaft and one or more horizontal rotors; and
   providing a battery augmentation trap mount for mounting the battery augmentation trap above the center of gravity of the vehicle body, wherein the battery augmentation trap mount is attached to a base portion of the unmanned aerial vehicle, and the battery augmentation trap mount is at least partially within the hollow rotor shaft.

2. The method of claim 1, wherein the unmanned aerial vehicle is a vertical launch vehicle, the method further comprising:
   opening the releasable latch to release the unmanned aerial vehicle after charging the energy supplies with the inductive charging device; and
   launching the unmanned aerial vehicle into an airborne state.

3. The method of claim 2, wherein the unmanned aerial vehicle is a rotorcraft, wherein before the releasable latch is opened, the one or more horizontal rotors are rotated to a launching velocity to produce lift forces on the unmanned aerial vehicle.

4. A method of charging energy supplies in an airborne unmanned aerial vehicle, the method comprising:
   providing a battery augmentation trap attached to the unmanned aerial vehicle, the battery augmentation trap comprising;
      a releasable latch, and
      an inductive charging device for charging the energy supplies,
   perching the unmanned aerial vehicle on a utility power line by maneuvering the airborne unmanned aerial vehicle so that the releasable latch of the unmanned aerial vehicle secures the utility power line within the releasable latch after which the utility power line supports the unmanned vehicle; and
   charging the energy supplies with the inductive charging device utilizing the electromagnetic field associated with the utility power line to generate power for the energy supplies,
   wherein the unmanned aerial vehicle is a vertical launch rotorcraft vehicle, the method further comprising:
   opening the releasable latch to release the unmanned aerial vehicle after charging the energy supplies with the inductive charging device;
   launching the unmanned aerial vehicle into an airborne state;
   providing a propulsion system having a hollow rotor shaft and one or more horizontal rotors, wherein before the releasable latch is opened, the one or more horizontal rotors are rotated to a launching velocity to produce lift forces on the unmanned aerial vehicle,
   wherein in the providing of the battery augmentation trap, the battery augmentation trap is attached to the vehicle body above the one or more horizontal rotors and positioned above the center of gravity of the vehicle and positioned along a vertical axis about which the one or more horizontal rotors rotate, wherein said vertical axis extends through the center of gravity of the vehicle, so that in the step of perching the unmanned aerial vehicle is supported by the latch such that the one or more horizontal rotors are maintained in a substantially horizontal orientation.

5. The method of claim 1, further including detecting the presence and the location of the utility power line.

6. The method of claim 1 further including:
providing one or more sensors for monitoring environmental conditions, the one or more sensors connected to the energy supplies,
wherein the charging of the energy supplies with the inductive charging device is provided either continuously or repeatedly to provide energy for the one or more sensors, the method further comprising;
indefinitely monitoring environmental conditions by leaving the unmanned aerial vehicle perched on the utility power line.

7. An unmanned aerial vehicle comprising:
a vehicle body including a vertical reference line and a horizontal reference line, the vehicle body having;
a base portion;
a propulsion system;
a battery augmentation trap, the battery augmentation trap comprising;
an inductive charging device for charging energy supplies; and
a releasable latch for releasably holding a utility power line, the battery augmentation trap attached to the vehicle body above the center of gravity of the vehicle body along a substantially vertical line through the center of gravity, wherein when the releasable latch holds the utility power line, the unmanned aerial vehicle is supported by the latch such that the horizontal reference line of the vehicle body and vertical reference line of the vehicle body are maintained in substantially horizontal and substantial vertical orientations respectively the vehicle body further having;
a battery augmentation trap mount for mounting the battery augmentation trap above the center of gravity of the vehicle body, the battery augmentation trap mount attached to the base portion, wherein the propulsion system includes a hollow rotor shaft and one or more horizontal rotors attached to the rotor shaft, wherein the battery augmentation trap is located above the one or more horizontal rotors, the battery augmentation trap attached to the battery augmentation trap mount, the mount at least partially within the hollow rotor shaft, wherein when the releasable latch holds the utility power line the one or more horizontal rotors are positioned to rotate without contacting the utility power line.

8. An unmanned aerial vehicle comprising:
a vehicle body including a vertical reference line and a horizontal reference line, the vehicle body having;
a propulsion system;
an inductive charging device for charging energy supplies; and
a releasable latch for releasably holding a utility power line, the releasable latch attached to the vehicle body above the center of gravity of the vehicle body along a substantially vertical line through the center of gravity, wherein when the releasable latch holds the utility power line, the unmanned aerial vehicle is supported by the latch such the that horizontal reference line of the vehicle body and vertical reference line of the vehicle body are maintained in substantially horizontal and substantial vertical orientations respectively, wherein the vehicle body includes an upper portion, wherein the inductive charging device is located on the upper portion to maximize the effects of the electromagnetic field emanating from the utility power line, and wherein the unmanned aerial vehicle is a helicopter and the inductive charging device is located on a tail boom portion of the helicopter.

9. The unmanned aerial vehicle of claim 8, wherein the propulsion system includes a hollow rotor shaft and one or more horizontal rotors attached to the rotor shaft, wherein the releasable latch is located above the one or more horizontal rotors, wherein when the releasable latch holds the utility power line the one or more horizontal rotors are positioned to rotate without contacting the utility power line.

10. The unmanned aerial vehicle of claim 8, further including sensing means for detecting the presence and location of utility power lines.

11. An unmanned aerial vehicle comprising:
a vehicle body including a vertical reference line and a horizontal reference line, the vehicle body having;
a vertical launch propulsion system having one or more rotors, wherein in an upright orientation the one or more rotors substantially coincide with the horizontal reference line and are rotatable about the vertical reference line;
an inductive charging device for charging energy supplies;
a releasable latch for releasably holding a utility power line, wherein in the upright orientation the releasable latch is attached to the vehicle body above the one or more rotors and positioned above the center of gravity of the vehicle and positioned along the vertical reference line about which the one or more rotors rotate, wherein the vertical reference line extends through the center of gravity of the vehicle.

12. The unmanned aerial vehicle of claim 11, wherein the vehicle body includes a base portion, the unmanned aerial vehicle further including a latch mount for mounting the releasable latch to the vehicle body, the latch mount attached to the base portion.

13. The unmanned aerial vehicle of claim 12, wherein the vertical launch propulsion system includes a hollow rotor shaft, wherein the one or more rotors are attached to the rotor shaft, the latch mount at least partially within the hollow rotor shaft, wherein when the releasable latch holds the utility power line the one or more horizontal rotors are positioned to rotate without contacting the utility power line.

14. The unmanned aerial vehicle of claim 11, wherein the inductive charging device is located within the releasable latch.

15. The unmanned aerial vehicle of claim 11, wherein the vehicle body includes a helicopter tail boom portion, wherein the inductive charging device is located on the tail boom portion.

* * * * *